Dec. 21, 1943.   C. W. BAKER   2,337,020
MANUFACTURE OF INSOLES
Filed July 24, 1942   4 Sheets-Sheet 1
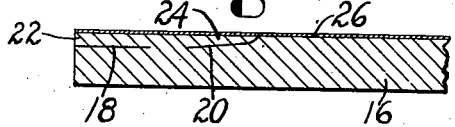
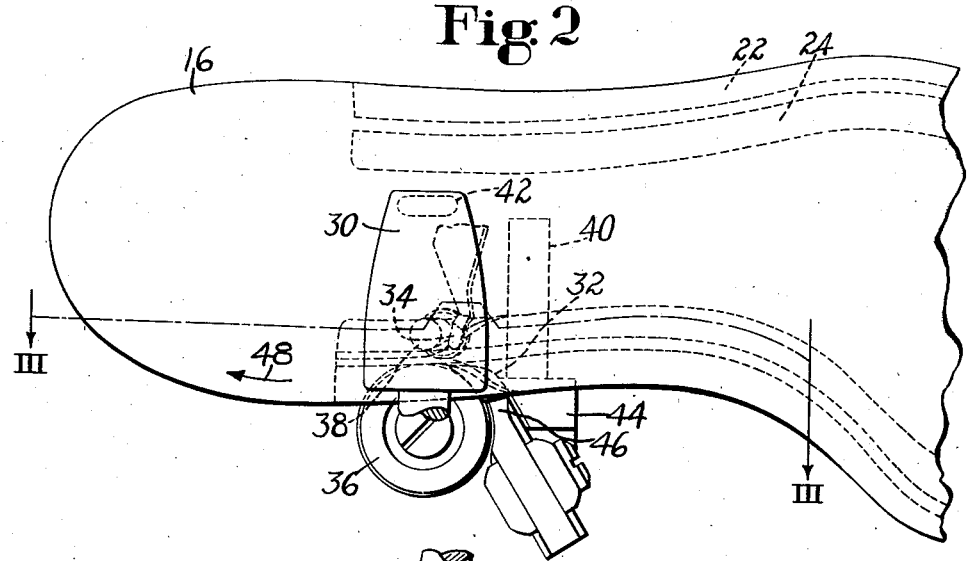
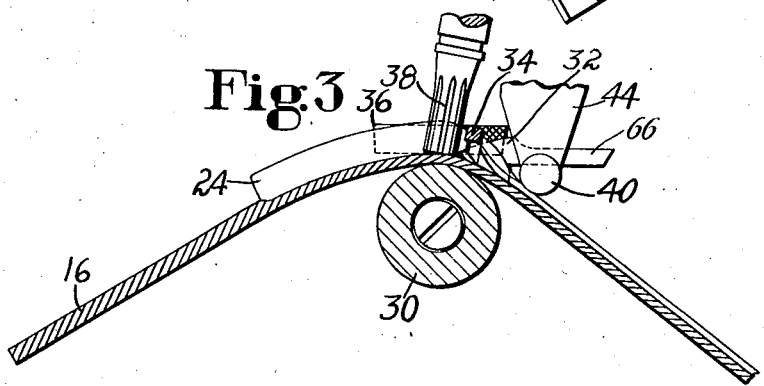
INVENTOR:
Calvin W. Baker
By his attorney Dec. 21, 1943.  C. W. BAKER  2,337,020
MANUFACTURE OF INSOLES
Filed July 24, 1942  4 Sheets-Sheet 2
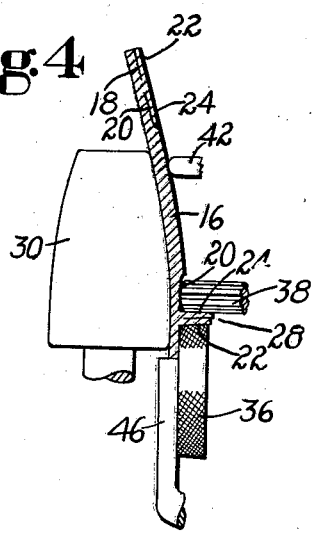
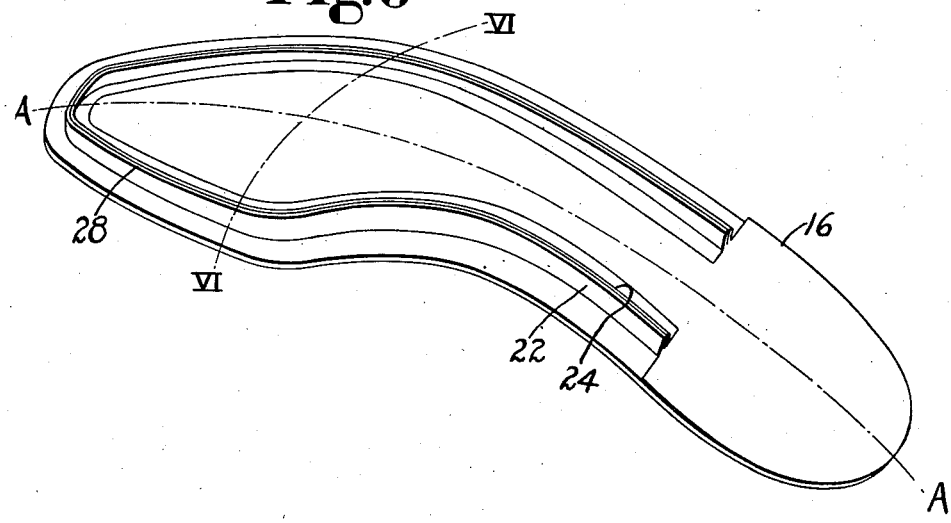
INVENTOR Dec. 21, 1943.  C. W. BAKER  2,337,020
MANUFACTURE OF INSOLES
Filed July 24, 1942  4 Sheets-Sheet 3
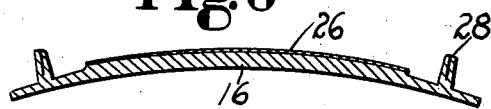
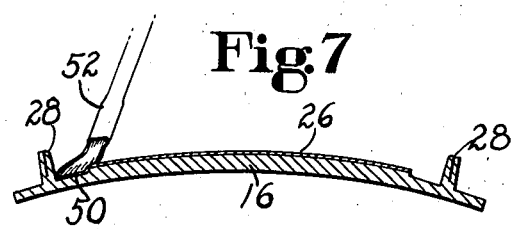
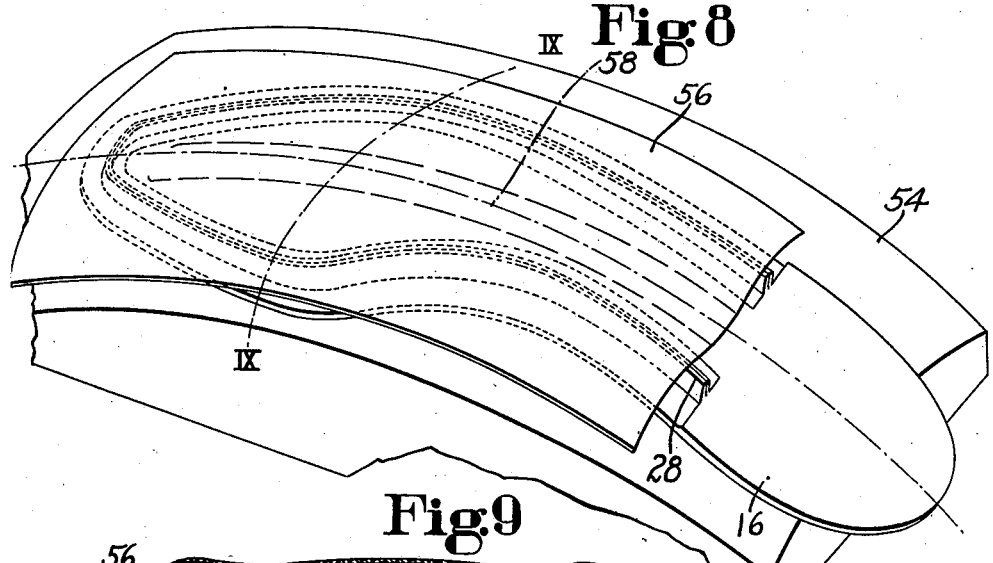
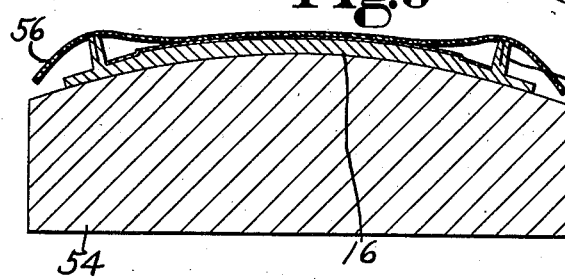

Dec. 21, 1943. C. W. BAKER 2,337,020
MANUFACTURE OF INSOLES
Filed July 24, 1942 4 Sheets-Sheet 4

INVENTOR

Patented Dec. 21, 1943

2,337,020

UNITED STATES PATENT OFFICE 2,337,020

MANUFACTURE OF INSOLES

Corwin W. Baker, Stoneham, Mass., assignor to United Shoe Machinery Corporation, Flemington, N. J., a corporation of New Jersey Application July 24, 1942, Serial No. 452,214

14 Claims. (Cl. 12—30)

This invention relates to the manufacture of insoles and has for its object to provide improvements in methods of and machines for making ribbed insoles for use in the manufacture of welted shoes.

In the manufacture of insoles for welted shoes a marginal sewing rib is formed by the turning up and setting in upstanding positions of the lips formed by the cutting of inner and outer marginal channels in the insole, the lip turning and setting operations being performed progressively lengthwise of the channel and usually involving the securing of the lips together in upturned positions by means of adhesive. In accordance with one method of reinforcing ribbed insoles now in general use, a strip of reinforcing material such as canvas having a coating of adhesive on its under side is positioned over the insole, cut to the desired length, and then by a so-called forming-in operation progressing lengthwise of the rib the canvas is pressed into the inner channel and against the base of the rib. The insole is then presented to a machine which completes the adhesion of the canvas to the inner face of the rib and trims off the surplus canvas flush with the upper edge of the rib.

In order that the insole, after the reinforcing canvas has been applied, shall have sufficient flexibility so that it will not offer undue resistance to bending in accommodating itself to the flexing movements of the foot, it has been proposed to curve the insole after the rib has been formed and before the canvas has been applied so that the insole will be convex longitudinally at its ribbed side. Such curving of the insole, however, tends to distort the rib or displace it from its desired perpendicular relation to the insole, and usually causes it to be inclined inwardly to an undesirable extent. To offset or counteract this tendency it has been proposed to curve the insole so as to impart transverse convexity to its ribbed face while the insole is being curved longitudinally. This expedient, however, is not always effective and provides no insurance that the rib will be uniformly positioned in a desired angular relation to the face of the insole.

In accordance with one feature of the present invention as herein illustrated the ribbed insole is bent progressively toward its unlipped side about lines transverse to its length during the operation of turning up and setting the lips, the bending taking place, however, in advance of the lip setting operation so that the lips are stretched or tensioned lengthwise by the bending and the lip turning operations before they are set and secured together to form the rib. The lips are under a substantial amount of longitudinal tension while they are being secured together and consequently the rib formed by the lips will offer no resistance to subsequent bending of the insole and the insole will tend to remain in a condition in which its unribbed face is concave longitudinally. The insole is also bent toward its unlipped side about lines extending lengthwise of the insole during the turning up and setting of the lips and its forepart the curvature of the insole will approximate that of the bottom curvature of a last and no distortion of the rib will take place when the insole is tacked to the last in the process of making the shoe.

As herein illustrated, the reinforcing material is applied to the ribbed side of the insole while the insole is supported in its curved condition, the canvas being pressed into contact with the insole and adhesively secured thereto along a zone restricted to the central median area of the insole. Thereafter, and while the insole is maintained in its curved condition, the reinforcing material is formed into the angle between the insole body and the inner side of the rib and the surplus reinforcing material is trimmed off flush with the upper edge of the rib.

Because of the longitudinally curved condition of the insole and the reinforcing material, the latter is subjected to considerable tension lengthwise of the rib where it overlies the latter and this tension makes it difficult successively to accomplish the forming-in operation. To facilitate a successful performance of the forming-in operation, as herein illustrated, the marginal portion of the reinforcing material is fed inwardly in a direction heightwise of the rib during the progress of the forming-in and trimming operations thereby to insure that the reinforcing material will be properly positioned in the apex of the angle at the bottom of the rib.

Invention is further to be recognized as residing in a machine for operating upon insoles having, in combination, means for progressively opening the channel and raising the channel flap of an insole, and means for bending the insole toward its unchanneled side while the channel is being opened.

With the above and other features and aspects in view, the invention will now be described with reference to the accompanying drawings, in which Fig. 1 is a fragmentary cross-sectional view on an enlarged scale of an insole as it appears when in condition to be operated upon in accordance with my improved method;

Fig. 2 is an end elevational view of the operative instrumentalities of an insole lip turning and setting machine showing the instrumentalities in operation upon an insole;

Fig. 3 is a sectional view taken substantially along the line III—III of Fig. 2;

Fig. 4 is a front elevational view of the operating instrumentalities of the lip turning and setting machine showing in cross-section the insole which is being operated upon;

Fig. 5 is a perspective view of the insole showing it as it appears after its channeled lips have been raised and set in upstanding positions to form a sewing rib, the view showing clearly the longitudinal curvature which is imparted to the insole during the lip raising and setting operation;

Fig. 6 is a cross-sectional view of the insole taken along the line VI—VI of Fig. 5 and showing the transverse curvature imparted to the insole during the lip turning and setting operation;

Fig. 7 is a view similar to Fig. 6 but illustrating the step of applying cement to the portion of the inner channel which was exposed by the raising of the channel lip;

Fig. 8 is a perspective view of the insole illustrating the initial step in the application of the reinforcing canvas thereto;

Fig. 9 is a cross-sectional view taken along the line IX—IX of Fig. 8;

Figure 10:
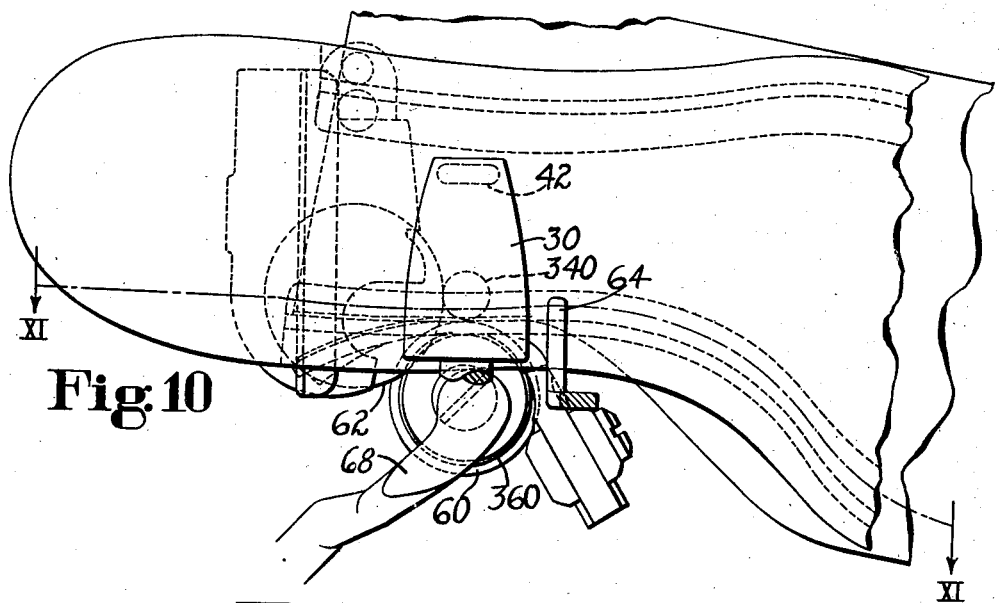
Fig. 10 is an end elevational view of the operative instrumentalities of the machine shown in Fig. 2 as fitted to form the reinforcing canvas into the angle at the inner side of the sewing rib.

The invention is herein illustrated with reference to its application to operations performed upon an insole 16 (Fig. 1) having an outer margin channel 18 and an inner marginal channel 20 forming, respectively, an outer lip 22 and an inner lip 24 and having an all-over coating 26 of cement upon its channeled side, the marginal portion of the cement coating being for the purpose of securing the lips 22, 24 together after they have been raised and the remainder of the coating being for the purpose of securing a strip of reinforcing material to the insole. As shown in Fig. 2, the channels and the channel lips extend only around the forepart and along opposite sides of the shank portion of the insole, the channels terminating rearwardly substantially at the heel breast line.

In carrying out the method of the present invention, as illustrated in the drawings, the insole is operated upon by an insole channel opening and lip setting machine of the type disclosed in United States Letters Patent No. 1,726,800, granted September 3, 1929, upon application of F. E. Bertrand. Such a machine will operate progressively lengthwise of the margin of a double lipped insole to raise the lips and to press them together so that they will become secured to each other by the cement on their opposed surfaces to form an upstanding sewing rib 28 (see Figs. 4 to 7). As illustrated in Figs. 2 to 4, inclusive, the machine comprises a driven sole supporting and feeding roll 30 mounted to turn about a vertical axis and arranged to engage the unlipped face of the insole, a pair of plows 32 and 34 (Fig. 2) arranged to turn up the lips 22 and 24, respectively, and a pair of driven rolls 36 and 38 mounted to turn about horizontal axes and arranged to press the lips together and set them in a predetermined angular relation to the insole to form the rib 28 and to cooperate with the role 30 in the feeding of the work. Except in respect to particulars hereinafter pointed out, the construction, arrangement and mode of operation of these parts is or may be substantially the same as described in the above-mentioned patent.

To adapt the illustrated machine for use in the practice of my improved method, the machine is provided also with a post 40 (Figs. 2 and 3) and an abutment 42 (Fig. 4) which are for the purpose of bending or curving the insole about the work supporting and positioning roll 30 as the insole is being fed through the machine.

The post 40 is carried by a bracket 44 which is secured to a stationary part of the frame of the machine and the post is so located as to engage the lipped face of the insole in advance of the locality where the lips are raised by the plows 32 and 34 and to cooperate with the roll 30 to bend the insole toward its unlipped side about lines transverse to the sole edge, thereby to impart to the insole a curvature which is longitudinally convex at the lipped side of the insole and longitudinally concave at the unlipped side thereof and which, in the forepart of the insole, approximates the longitudinal curvature of the bottom of a last.

The abutment 42 serves to bend the insole about lines extending longitudinally thereof and to hold its unlipped face against the periphery of the supporting roll 30 as the insole is being fed. As shown in Fig. 4, the roll 30 tapers toward its upper end and its periphery is transversely convex, the convexity corresponding approximately to the transverse convexity of the bottom of a last. Consequently, the portion of the insole which is held against the roll 30 by the abutment 42 is curved transversely to substantially last bottom curvature.

In the machine as disclosed in the patent above referred to the lip setting rolls are disposed with their axes substantially perpendicular to the direction of work feed. Such an arrangement of the upper roll, however, does not adapt it for most efficient operation upon soles which are curved or bent in the locality where the setting of the lips is to take place, inasmuch as there would be a tendency for the roll to ride out of the respective lip channel, particularly if the lip is slashed as it usually is in the regions adjacent to the more sharply curved portions of the sole edge. To insure against such tendency the upper lip setting roll 38 is disposed with its axis inclined in a horizontal plane with respect to the general direction of feed of the work in the region operated upon by the rolls, as indicated in Fig. 3, so that as the rolls rotate the end face of the upper roll will engage the channeled surface of the insole body at points well in advance of the vertical axial plane of the roll.

In the use of the machine an insole to be operated upon is held by the operator in a vertical plane and presented with its heel end located between the post 40 and the roll 30, the unchanneled side of the insole facing the roll 30. The heel portion of the sole is then introduced between the periphery of the supporting roll 30 and the adjacent end faces of the rolls 36 and 38, and the lip turning plows 32 and 34 are caused to enter the channels 18 and 20 at the lower margin of the insole. As shown in Figs. 2 and 4, an edge gage 40 is employed to assist in positioning the insole relatively to the plows at the start of the lip turning operation, the gage being conveniently formed upon the downwardly extending shank portion of the plow 32. The machine having been started, the sole margin is fed in the direction of the arrow 48 in Fig. 2, and the ends of the lips 22 and 24 are first raised to upstanding positions by the plows and then engaged by the rolls 36 and 38 which press them together, and these operations progress lengthwise of the sole edge until the lips have been acted upon along the shank portion of one lateral margin of the insole, around the forepart of the insole, and along the shank portion to the heel breast line at the opposite lateral margin of the insole. In Figs. 2 and 3 the insole is shown as it appears with reference to the operating instrumentalities of the machine just after the machine has started to operate.

It will be seen that the lips are being raised by the plows at a point in advance of where they are being pressed together by the rolls 36 and 38. Because of this fact and inasmuch as the lips conform to the bend or curve of the sole before being engaged by the plows, the lip raising action of the plows results in stretching the lips substantially in lengthwise directions before they are acted upon by the lip setting rolls. Consequently, when they are being set and secured together they are under a substantial amount of longitudinal tension and thus the rib formed by the lips will offer no substantial resistance to such subsequent bending of the insole as will take place after the insole has been incorporated in a shoe. The forepart of the shoe bottom will thus be free to bend as required in accommodating the flexure of the foot in walking.

From Fig. 3 it will be apparent that the post 40 which bears against the lipped side of the sole in advance of the supporting roll 30 deflects or bends the sole a substantial amount toward the roll as the sole is being fed. Inasmuch as this bending action progresses lengthwise along the sole as the sole is being fed, the sole will be bent or curved about successive lines extending transversely thereto (where the sole engages the periphery of the roll 30) until the sole has been made longitudinally convex at its lipped side and correspondingly concave at its opposite side. The longitudinal curvature imparted to the sole by the post is clearly illustrated in Fig. 5. Fig. 4 illustrates clearly the bending or conforming of the insole to the transverse contour of the periphery of the roll 30. It will be noted that while the insole is thus curved transversely only from its lower edge approximately to its central portion at any given period in the course of its feeding movement, nevertheless, the entire area of the insole will have been subjected to this transverse bending action before the lip turning operation has been completed and consequently the portion of the insole which is uppermost in Fig. 4 will be curved as well as the lower portion thereof with the result that the insole will be transversely curved from edge to edge, as shown in Fig. 6, to approximate the transverse curvature of the bottom of a last.

After the lips have been turned and set to form the rib 28 and the insole has been curved both longitudinally and transversely as above described, a layer of reinforcing material, such as canvas, is to be applied to the ribbed side of the insole so as to cover the surface bounded by the rib and to overlie the inner side of the rib. While it is not necessary to have the canvas secured to the inner wall of the rib, it is important that it be formed in to the apex of the angle at the base of the rib and that it be secured by cement to the surface formed on the insole body by the cutting of the inner channel. Accordingly, this portion of the insole surface is now coated with cement as indicated at 50 in Fig. 7, the cement being applied, for example, by means of a brush 52, care being taken, however, to insure that no cement will be applied to the inner side of the rib 28 since the presence of any cement on the rib would tend to interfere with the forming of the canvas into the angle at the base of the rib.

To insure that the cementing of the canvas to the insole will not tend to flatten the insole, the insole is supported upon a form 54 (Figs. 8 and 9) the upper surface of which is curved both lengthwise and crosswise to correspond to the lengthwise and crosswise curvatures which have been imparted to the insole in the process of the lip turning and setting operation. While the insole is thus supported upon the form 54 a strip of canvas 56 is laid over the insole as shown in Figs. 8 and 9, the strip being wide enough to extend a substantial distance beyond the rib 28 at both lateral margins of the insole. The canvas, after having been laid or positioned above the insole, will rest upon the top edge of the rib and will bridge the portions between the rib and the central part of the insole, as clearly shown in Fig. 9. Thereafter, light pressure is applied to the canvas along a zone restricted to the longitudinal median area of the insole, this area being indicated by the portion 56 in Fig. 8. The insole is now ready for the performance thereon of two operations consisting of "forming in" the canvas to the angle at the base of the rib and trimming off the surplus marginal portion of the canvas so as to leave its edge flush with the top edge of the rib 28.

These operations may be accomplished by hand but I prefer to perform them by the use of a machine such as that hereinbefore described as being used for raising and setting the channel lips, the lip-turning plows having been removed from the machine and certain substitute fittings having been provided for forming in and trimming the canvas.

Figure 11:
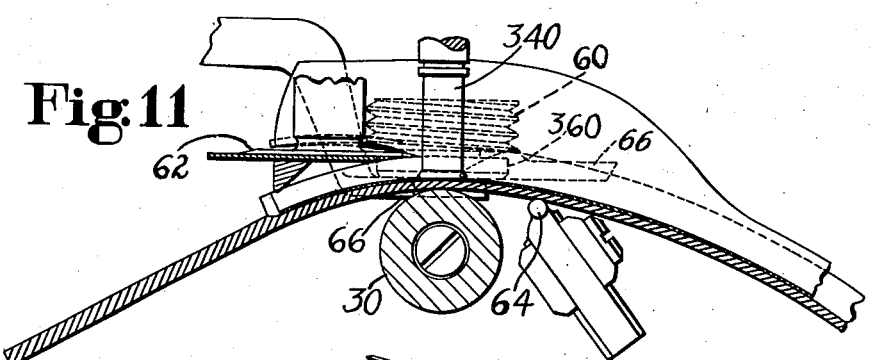
Fig. 11 is a sectional view taken substantially along the line XI—XI of Fig. 10.
Figure 12:
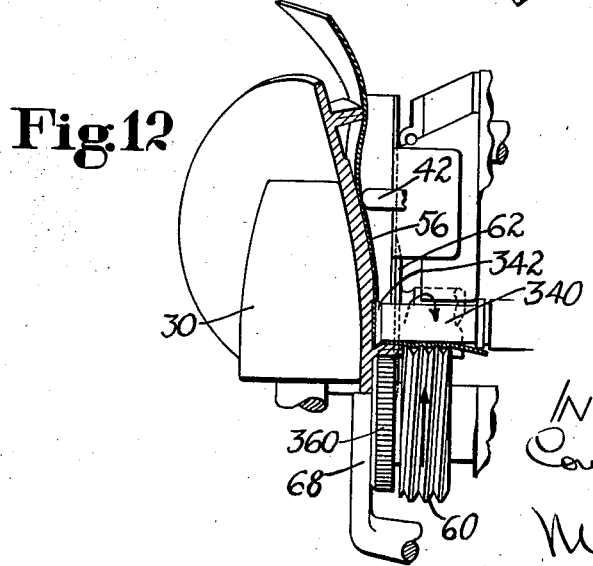
Fig. 12 is a front elevational view of the operative instrumentalities shown in Figs. 10 and 11 showing in cross-section the insole which is being operated upon.

As illustrated in Figs. 10, 11 and 12, the work supporting and positioning roll 30 is or may be the same as that employed in performing the lip turning and setting operation, and the same abutment 42 is employed for holding the insole in engagement with the roll 30, the abutment cooperating with the roll to preserve the transverse curvature of the insole as the latter is being fed through the machine.

The lower feed roll 360 is like the feed roll 36 hereinbefore referred to, its periphery being milled or knurled to insure a non-slipping feeding engagement with the work. In place of the upper feed roll 34 there has been substituted a roll 340 which cooperates with the roll 360 to feed the insole and has at its free end a peripheral flange 342 for forming the canvas 56 into the angle at the base of the insole rib. As shown in Fig. 11 the roll 340 is disposed with its axis parallel to that of the lower feed roll 360.

For cooperating with the roll 340 to engage opposite sides of the marginal portion of the canvas 56 which extend outwardly beyond the rib, a worm wheel 60 which is slightly larger in diameter than the feed roll 360 is fixed to the shaft which carries the roll 360. The teeth of the worm wheel 60 are pitched as shown in Fig. 12 and, as the roll 340 and the worm wheel 60 are caused to rotate in directions indicated by the arrows in that figure, the teeth of the worm wheel will slip or slide somewhat over the surface of the canvas and will frictionally feed the canvas inwardly toward the base of the insole rib to facilitate the action of the flange 342 in forming in the canvas.

In order that the insole, after the canvas has been applied to it, shall offer a minimum amount of resistance to the flexure of the foot in walking, it is desirable that the insole shall be maintained in its hereinbefore described longitudinally bent or curved condition during the performance of the canvas forming-in operation. However, with the insole curved in this manner, the canvas, which conforms to the lengthwise curvature of the insole, is under a substantial amount of tension lengthwise of the sole where it overlies the top edge of the rib and considerable resistance is offered to the act of forming in the canvas from the bridging condition illustrated in Fig. 9 to a condition such as that shown in the lower portion of the insole in Fig. 12. It is for the purpose of counteracting this resistance and thus facilitating the satisfactory performance of the forming-in operation that the worm wheel 60 is employed. It will be seen from an inspection of Fig. 12 that the worm wheel 60 positions the marginal portion of the canvas in line with the inner side of the rib of the insole so that the canvas will no longer be tensioned over the edge of the rib in the locality where the forming-in operation is to take place. The action of the worm wheel in thus positioning the marginal portion of the canvas and its action in feeding the canvas in the direction in which it must be moved before it can be worked into the angle at the base of the rib very effectively insures that the canvas will be finally seated in the apex of the angle between the insole body and the inner side of the rib. This feeding action of the worm wheel renders unnecessary the performance of a preliminary hand forming-in operation upon the convas covered insole such as that which has commonly been practiced heretofore.

The machine fitted for forming in the canvas, as illustrated in Figs. 10 to 12, is equipped also with a rotary knife 62 which operates to trim the canvas flush with the top edge of the rib immediately after the canvas has been formed in, the trimming knife being constructed and arranged as described in the Letters Patent hereinbefore referred to and operating as more fully described in said patent to effect the trimming of the canvas flush with the top of the insole rib. The illustrated machine is provided also with a post 64 which engages the unribbed side of the insole in such a position with relation to a plowlike abutment 66 arranged to engage the lipped side of the sole, as to maintain the sole in its longitudinally curved condition while the canvas is being formed in against the rib. An edge gage 68 is also provided in the illustrated machine for assisting in positioning the insole at the start of the forming-in operation.

The above-described improvements relating to the method of and the machine for applying the reinforcing layer to the insole are not claimed herein, the same constituting the subject-matter of a divisional application, Serial No. 480,637, filed March 26, 1943.

Having described my invention, what I claim as new and desire to secure by Letters Patent of the United States is:

1. That improvement in the manufacture of ribbed insoles which consists in providing an insole having an unopened marginal channel and a channel lip formed by said channel, bending said insole toward its unlipped side about lines extending transversely of the insole, and thereafter opening the channel and raising the lip of the bent insole thereby stretching the lip longitudinally and positioning it to form a rib.

2. That improvement in the manufacture of ribbed insoles which consists in operating progressively lengthwise of an insole having an unopened marginal channel forming a channel lip to bend the insole toward its unchanneled side thereby tensioning said lip longitudinally, and operating upon previously bent marginal portions of the insole while said bending operation is progressing and while said lip is under tension to raise the lip into an upstanding position thereby further stretching said lip and positioning it to form a rib.

3. That improvement in the manufacture of ribbed insoles which consists in operating progressively lengthwise of an insole having unopened inner and outer marginal channels forming inner and outer channel lips to bend the insole toward its unchanneled side about lines extending transversely of the insole thereby to tension said lips longitudinally, and operating progressively along previously bent marginal portions of the insole to raise the lips of the channels and thereby to stretch them longitudinally and to set them in opposed upstanding positions after they have been stretched to form a rib.

4. That improvement in the manufacture of ribbed insoles which consists in providing an insole having an unopened marginal channel and a channel lip, and bending the insole toward its unchanneled side about lines transverse to its longitudinal axis while progressively opening the channel and raising the channel lip to upstanding position to form a sewing rib.

5. That improvement in the manufacture of ribbed insoles which consists in providing an insole having an unopened marginal channel and a channel lip formed by said channel, bending said insole toward its unchanneled side along lines extending both crosswise and lengthwise of the insole thereby shaping the forepart of the insole to approximate the bottom curvature of the forepart of a last, and thereafter opening said channel and raising said lip to form a rib.

6. That improvement in the manufacture of ribbed insoles which consists in operating progressively lengthwise of an insole having an unopened marginal channel and a channel lip formed by said channel to bend the insole toward its unchanneled side along lines extending both crosswise and lengthwise of the insole, and during said progressive operation opening the channel and upturning the channel lip to form a rib.

7. That improvement in the manufacture of ribbed insoles which consists in providing an insole having unopened inner and outer marginal channels forming inner and outer channel lips, applying cement to the outer surfaces of said lips, progressively bending the insole toward its unchanneled side, and operating progressively along previously bent marginal portions of the insole to raise the lips of the channel into upstanding positions and to press them toward each other so that they will become secured together by means of said cement to form a sewing rib.

8. That improvement in the manufacture of insoles which consists in progressively raising the channel lip of a marginally channeled insole while the insole is being fed to advance its margin progressively past an operating point, and operating progressively lengthwise of the insole in a locality rearward of said operating point during the feeding of the insole to bend the insole toward its unchanneled side about lines extending crosswise of the insole thereby tensioning said lip in a lengthwise direction before the lip is raised.

9. In a machine for operating upon insoles, the combination with means for progressively opening the channel and raising the channel lip of an insole, of means for bending the insole toward its unchanneled side while the channel is being opened.

10. In a machine for operating upon insoles, the combination with means for progressively opening the channel and raising the channel lip of an insole, of means for bending the insole toward its unchanneled side to convex the insole both longitudinally and transversely at its channeled side while the channel is being opened.

11. That improvement in the manufacture of ribbed insoles which consists in providing an insole having an unopened marginal channel and a channel lip formed by said channel, bending the insole toward its unlipped side about lines extending transversely of the insole thereby stretching the lip longitudinally, and thereafter opening the channel and raising the lip into position to form a rib.

12. In a machine for operating upon channeled insoles, the combination with means for opening the channel and raising the channel lip into upstanding position to form a sewing rib, of means for feeding the margin of the insole to said channel opening and lip raising means, and means operating while the margin of the insole is being fed for bending the insole toward its unchanneled side about lines extending transversely of the insole to stretch the channel lip in a lengthwise direction before the lip is raised into upstanding position.

13. In a machine for operating upon channeled insoles, the combination with means for opening the channel and raising the channel lip into upstanding position to form a sewing rib, of means for feeding the margin of the insole to said channel opening and lip raising means, means operating while the margin of the insole is being fed for bending the insole toward its unchanneled side about lines extending transversely of the insole to stretch the channel lip in a lengthwise direction before the lip is raised into upstanding position, and means operating while the margin of the insole is being fed for bending the insole toward its unchanneled side about lines extending lengthwise of the insole.

14. In a machine for operating upon channeled insoles, the combination with means for opening the channel and raising the channel lip into upstanding position to form a sewing rib, of cooperating feed rolls for gripping the margin of the insole and feeding said margin to said channel opening and lip raising means, one of said rolls being disposed with its axis substantially perpendicular to the direction of work feed and the other roll having its axis inclined with respect to said direction, and means operating while the margin of the insole is being fed for bending the insole toward its unchanneled side.

CORWIN W. BAKER.